United States Patent [19]

Ma et al.

[11] 4,164,481

[45] Aug. 14, 1979

[54] PROCESS OF REGENERATING A NOBLE METAL CATALYST USED IN THE REDUCTION OF ORGANIC NITRO COMPOUNDS

[75] Inventors: King W. Ma; Irvin W. Potts; Russell A. Malek, all of Midland, Mich.

[73] Assignee: The Dow Chemical Company, Midland, Mich.

[21] Appl. No.: 872,986

[22] Filed: Jan. 27, 1978

[51] Int. Cl.$^2$ .................. B01J 23/96; B01J 21/20
[52] U.S. Cl. .................. 252/412; 252/413; 252/414; 260/575; 260/689
[58] Field of Search ........... 252/414, 412, 413, 411 R, 252/447, 416; 260/575, 689

[56] References Cited

U.S. PATENT DOCUMENTS

| | | | |
|---|---|---|---|
| 2,749,359 | 6/1956 | Calkins et al. | 252/413 |
| 3,079,435 | 2/1963 | Freifelder et al. | 260/575 |
| 3,214,385 | 10/1965 | Kolyer | 252/412 |
| 3,576,767 | 4/1971 | Summers | 252/447 |
| 3,824,193 | 7/1974 | Williams | 252/412 |
| 3,901,822 | 8/1975 | Browning | 252/412 |
| 3,959,382 | 5/1976 | Yeh et al. | 252/411 R |

OTHER PUBLICATIONS

Chemical Abstracts – 81; 127336S, 1974, Matzuzawa et al., "Reclaiming a Catalyst by Treating with Aqueous Alkali, Oxidizing then Reducing".
Chem. Abs. – 81; 127337T, 1974, Matzuzawa et al., "Reclaiming a Catalyst by Treating with Aqueous Alkali and Reducing".

*Primary Examiner*—P. E. Konopka
*Attorney, Agent, or Firm*—Michael L. Glenn

[57] ABSTRACT

Noble metal catalysts are regenerated according to a process comprising the steps of washing the deactivated catalyst with a polar organic solvent; contacting the washed catalyst with a hot aqueous alkali metal hydroxide solution; contacting the catalyst with an oxygen-containing gas at moderately elevated temperatures; and washing the catalyst a final time with a polar organic solvent. This method of regenerating the catalyst is particularly useful to reactivate palladium on carbon catalysts deactivated in the reduction of nitrophenol compounds to aminophenols.

10 Claims, No Drawings

PROCESS OF REGENERATING A NOBLE METAL CATALYST USED IN THE REDUCTION OF ORGANIC NITRO COMPOUNDS

BACKGROUND OF THE INVENTION

This invention relates to the regeneration of noble metal hydrogenation catalysts. In one aspect, the invention relates to the regeneration of palladium and platinum catalysts. In another aspect, the invention relates to the regeneration of such catalysts after use in the reduction of organic compounds with nitro moieties to the corresponding amines.

Noble metal catalysts, because of their nature, lose their activity after prolonged use. Since these catalysts are relatively expensive, it is clearly advantageous to regenerate them rather than replace them. The regenerated catalyst should preferably be substantially as active and selective as a freshly prepared catalyst.

It is well-known in the art to use steam or hot gases to volatilize organic liquids and thus remove them from the catalysts. It is also known to subject deactivated catalysts to an oxidizing treatment to reactivate the catalyst. These prior art methods are not very satisfactory as both methods are generally ineffective to restore more than partial catalytic activity.

Processes have also been developed in the art for reactivation of particular noble metal hydrogenation catalysts employed in specific hydrogenation systems. U.S. Pat. No. 3,824,193 discloses that alumina-supported palladium catalysts used in catalyzing the hydrogenation of organic esters can be reactivated by treating the catalyst briefly with an aqueous alkali metal hydroxide solution and then heating the catalyst in air to a temperature between 100° C. and 500° C. Noble metal hydrogenation catalysts used for producing hydrogen peroxide by the anthraquinone process can be regenerated in accordance with U.S. Pat. No. 3,901,822 by contacting the catalyst with a polar organic solvent; then contacting it with an aqueous ammonium hydroxide solution; and finally contacting the catalyst with steam and an oxygen-containing gas at temperatures from about 250° C. to the transition temperature of the catalyst crystal structure. Palladium catalysts employed in the hydrogenation of reducible cyclic organic compounds containing nitrogen impurities are regenerated by contacting the separated catalyst with an agent selected from the group consisting of alkali metal and alkaline earth metal bicarbonates, carbonates, nitrates, chlorides, fluorides and hydroxides in a liquid reaction medium as is taught in U.S. Pat. No. 3,959,382.

The foregoing prior art methods for reactivation of particular hydrogenation catalysts in specific systems are not effective to more than partially regenerate the activity of a highly deactivated catalyst employed in the reduction of organic nitro compounds. It is highly desirable then to provide a method whereby a noble metal catalyst deactivated in the prolonged reduction of organic nitro compounds can be economically regenerated to an activity substantially equivalent to that of a freshly prepared catalyst.

SUMMARY OF THE INVENTION

According to the process of the present invention, a noble metal catalyst which has become deactivated in the reduction of organic compounds with nitro moieties to the corresponding aminated derivatives is regenerated in a process comprising the steps of contacting said deactivated catalyst with a polar organic solvent; contacting the solvent-treated catalyst with an aqueous solution of an alkali metal hydroxide at a temperature from about 20° C. to about 150° C.; contacting the catalyst with an oxygen-containing gas at a temperature from about 20° C. to about 150° C. prior to or following the contact of said catalyst with said hydroxide solution; and contacting said catalyst with a polar organic solvent, so as to effect regeneration of the deactivated catalyst.

Surprisingly, the practice of the present invention in the most desirable embodiments can regenerate the deactivated catalyst to a level of activity substantially equivalent to that of the freshly prepared catalyst. Even in the less preferred embodiments the practice of this invention reactivates the catalyst to a degree of activity acceptable for economical reuse of the catalyst. Typically, a catalyst deactivated to a level of activity less than about 50 percent of that of a broken in, new catalyst can be regenerated to a level of activity at least 70 percent of that of a broken in, new catalyst by the practice of the method of this invention. Furthermore, the practice of this invention avoids the higher temperatures employed in the prior art methods for reactivation of hydrogenation catalysts in specific systems. Temperatures elevated above about 150° C. are undesirable not only because of the energy wasted in such heating, but also because extended heating can sinter the catalyst and reduce its activity.

The catalyst regeneration process employed in the practice of this invention is useful to prolong the life of palladium hydrogenation catalysts employed in the reduction of organic nitro compounds to amine derivatives. This catalyst regeneration process is particularly useful when the catalyst has been employed to reduce nitrophenol compounds, more particularly para-nitrophenol compounds, to the corresponding aminophenol derivatives.

DETAILED DESCRIPTION OF THE EMBODIMENTS

The regeneration process of this invention can suitably be employed to regenerate the activity of palladium and other noble metal catalysts, where the activity of said catalyst has diminished after prolonged use. Although the invention is described herein broadly as being suitable to regenerate noble metal catalysts employed in the reduction of organic nitro compounds, it is particularly applicable to the regeneration of catalysts which have become deactivated due to continued reduction of compounds of the formula

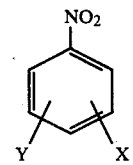

wherein X and Y are, independently, hydrogen, hydroxyl, nitro, alkyl of 1 to 3 carbon atoms, alkoxyl of 1 to 3 carbon atoms, hydroxyalkyl of 1 to 3 carbon atoms, halide, amino, or hydroxyamino moieties and at least one of the X and Y substituents is located in an ortho or para position relative to the nitro group. Most advantageously, the catalyst to be regenerated has been deactivated by the continued reduction of para or ortho nitrophenolic compounds, especially para or ortho nitrophenol, to the corresponding aminophenolic derivatives.

The catalysts which can suitably be regenerated by the practice of the method of this invention are the noble metal catalysts. These catalysts include ruthenium, rubidium, rhodium, iridium, platinum, palladium or a combination of these metals, but advantageously the catalyst consists essentially of palladium and/or platinum, more advantageously palladium. The catalyst can suitably be regenerated when present with certain activators which increase the hydrogenation rate of the catalyst or other additives. Such activators can include oxides or hydroxides of iron, nickel, cobalt, magnesium, aluminum, manganese, chromium, vanadium, or tungsten. The catalyst can be sulfided, but regeneration may remove some of the sulfide.

The catalyst can conveniently be regenerated by the present method when supported on a carrier of suitable particle size. The carrier can consist of dolomite, magnesium carbonate, carbon, or some other support material substantially inert to the regeneration conditions, but carbon is the carrier of choice. Alumina is not desirable as a support material because it reacts with the hydroxide solution at the conditions of this method. The practice of the method of this invention is particularly suited to the regeneration of a catalyst deposited on a carbon support to effect a weight concentration from about 0.1 to 25 percent, more preferably from 0.2 to 2.0 percent, of the particle weight.

The method by which the catalyst is prepared is not necessarily critical to the regeneration of the catalyst by the present method. Suitable methods of preparation are described in the art in U.S. Pat. Nos. 2,823,235; 3,265,636; and 3,271,327 as well as in many other references in the art. A catalyst can be regenerated several times by the method of this invention, but the degree of regeneration generally diminishes with successive regenerations. Desirably, a deactivated catalyst to be economically regenerated should have an activity less than 50 percent, more preferably less than 35 percent, of the activity of a broken in, new catalyst.

The catalyst to be regenerated can suitably be one used in a catalyzed reaction carried out in either a batch reaction or a "fixed bed" reaction. The regeneration procedure of this invention is preceded by separating by conventional means, such as filtration or decantation, the deactivated catalyst particles from the solution utilized in the hydrogenation or other catalyzed reaction. Conveniently, the catalyst is one employed in a fixed bed, so that the deactivated catalyst can be readily separated from the solution utilized in the catalytic reaction by simply draining said solution from the catalytic reaction vessel. Said vessel can then be conveniently employed as the vessel in which the deactivated catalyst is regenerated by the method of the present invention.

Conveniently, the separated catalyst is placed in a vessel which is suitable for use in all of the steps necessary for the regeneration of the activity of the catalyst in accordance with this method so as to minimize handling of the catalyst. More desirably the reactor used in the catalytic reaction is outfitted so as to provide a suitable vessel for regeneration. It is desirable that the catalyst be distributed in the vessel so that the solutions and gases employed in the present method come in contact with substantially all of the deactivated catalyst.

To regenerate the activity of the catalyst, the deactivated catalyst is first brought in contact with a polar organic solvent. The amount of polar organic solvent should be at least sufficient to permit substantially all of the catalyst surface to come in contact with said solvent. The catalyst need not be immersed in the solvent so long as the requisite contact is effected.

The temperature during and duration of the contact between the catalyst and the organic solvent is not necessarily critical. Generally, the amount of residual impurities removed from the catalyst increases at higher temperatures and longer contact times. Temperatures in the range from about 20° C. to about 150° C. are suitable, with temperatures in the range from about 50° C. to about 150° C. being preferred. Lower and higher temperatures than those in the preferred range can be employed, but the former may necessitate uneconomical exposure times and the latter can have pernicious effects on catalyst activity. The duration of the contact between the catalyst and said solvent is determined by the nature of the catalyst, the amount of adsorbed impurities and the severity of the conditions during contact. At temperatures in the preferred range, the contact duration can conveniently be relatively short, generally in the range from about 0.5 to about 1 hour for palladium on carbon catalyst. Longer times can be employed and may be necessary with some of the less preferred deactivated catalysts, but are not desirable for reasons of economy unless necessary. Shorter times can be used if the catalyst is only slightly deactivated.

The composition of the atmosphere and the pressure under which the contact between the deactivated catalyst and the polar organic solvent takes place is not necessarily critical. Conveniently, the pressure is in the range from 25 to 50 pounds per square inch gauge (psig) and the atmosphere is substantially inert.

Most polar organic solvents containing from 1 to 10 carbon atoms which are substantially inert to the reactants and products in the catalyzed reaction are suitable for use in the present method. Polar organic solvents which react with the reactants or products of the catalyzed reaction are suitable, but are not preferred because the trace amounts of solvent present after regeneration of the catalyst can interfere with reuse of the catalyst. Preferred polar organic solvents for use in the present method are: methanol, ethanol, n-propanol, n-butanol, isopropanol, isobutanol, sec-butanol, tert-butanol, allyl alcohol, crotyl alcohol, formic acid, acetic acid, propionic acid, butyric acid, ethylene glycol, propylene glycol, 1,3-propanediol, 1,2-butanediol, meso-2,3-butanediol, 1,4-butanediol, glycerol, ethyl ether and n-propyl ether. More preferably the solvent employed in the catalyzed reaction is also employed as the polar organic solvent. If the last catalytic reaction medium in contact with the catalyst was fairly dilute, i.e., containing a total concentration of reactants, products and other dissolved organic compounds of less than about 1 mole per liter, preferably less than 0.1 mole per liter, the catalytic reaction medium can serve as the polar organic solvent contacted with the deactivated catalyst in accordance with this method. Where the method of this invention is practiced in the regeneration of such particularly suitable catalysts as those deactivated in the reduction or aromatic nitro compounds, the preferred polar organic solvent is acetic acid. The solvent used in this regenerative treatment can generallly be conveniently distilled to eliminate dissolved impurities and reused.

After the catalyst has been treated with the solvent, it is desirable, to contact the solvent-treated catalyst with water to remove additional impurities. This catalyst is separated from the organic solvent by any conventional means and is then contacted with distilled water in a manner consistent with and under conditions similar to those set out above for the polar organic solvent.

After the catalyst has been contacted with the polar organic solvent and separated from said solvent, the catalyst is contacted with an aqueous alkali metal hydroxide solution and in a separate step is contacted with an oxygen-containing gas. The contact with said hydroxide solution can suitably precede or follow the contact with the oxygen-containing gas, but the sequence of choice is contact with said hydroxide solution followed by contact with said gas.

The alkali metal hydroxide solution preferably has an initial concentration of at least about 0.1 normal, preferably at least about 1 normal. The contact can be achieved by immersion of the catalyst in said solution or by other conventional means, so long as substantially all of the deactivated catalyst comes in contact with the solution.

Alkali metal hydroxides suitable for use in the method of the present invention include lithium hydroxide, sodium hydroxide and potassium hydroxide. The preferred alkali metal hydroxide solution is a sodium hydroxide solution.

The temperature during the contact of the aqueous alkali metal hydroxide solution and the catalyst suitably is in the range from about 20° C. to about 150° C., preferably from about 75° C. to about 125° C., during a substantial portion of the period of contact. Temperatures from 125° C. to about 150° C., depending on the specific catalyst, can have a deleterious effect on catalyst activity. Temperatures in the range from about 20° C. to about 75° C. are not preferred because of the reduced solubility of impurities at these temperatures. More preferably the temperature is in the range from about 90° C. to about 110° C., most preferably about 100° C.

The contact between the catalyst and the alkali metal hydroxide solution is preferably conducted under an atmosphere substantially inert to the impurites present, so as to prevent the reaction of impurities with the atmosphere which can complicate the removal of said impurities from the catalyst. The atmosphere can suitably be slightly reactive, as when it comprises a minor amount of oxygen or when filtered air is employed as an atmosphere, but this is not preferred. The preferred inert atmospheres include nitrogen, hydrogen and mixtures of the foregoing with other inert gases.

The pressure of this atmosphere is suitably atmospheric or superatmospheric. Preferably, the pressure is slightly above atmospheric pressure, so as to facilitate the penetration of the hydroxide solution into the support of the catalyst and the removal of the more deeply embedded impurites from the catalyst. More preferably a pressure in the range from about 20 to about 50 psig is employed, most preferably about 25 psig.

The duration of contact between the catalyst and the hydroxide solution is determined by the nature of the catalyst, the amount of adsorbed impurities to be removed and the severity of the conditions employed. Generally, a contact time in the range from about 0.1 hour to 5 hours is suitable for a deactivated palladium on carbon catalyst. The longer times in the suitable range are not economical. Shorter times in this range are suitable where the deactivation is slight or the temperature, concentration of the hydroxide solution, or pressure are comparatively high. The preferred contact time is in the range from about 0.5 hour to about 1 hour for a deactivated palladium on carbon catalyst.

After the catalyst is contacted with the hydroxide solution, the catalyst is separated from the solution by conventional means and preferably washed with water. More preferably, the catalyst is washed with water until the wash water after contacting the catalyst is substantially neutral, i.e., a pH in the range from about 7 to about 9. This water wash is desirable to rinse impurities from the surface of the catalyst.

After the catalyst is separated from the hydroxide solution by conventional means or prior to contact with said solution, the catalyst is contacted with a flow of oxygen-containing gas. It is desirable that the gas flow be directed so that substantially all of the catalyst comes in contact with the oxygen-containing gas. The term oxygen-containing gas means oxygen or a gaseous mixture containing oxygen such as air. Air or some other gas wherein the bulk of the gas is inert is desirable because of the danger of combustion of residual organic impurities where the oxygen-containing gas contains a higher percentage of oxygen. Steam can be employed as a component of the oxygen-containing gas mixture, but it is not essential that steam is present.

The contact between the catalyst and the oxygen-containing gas preferably occurs at a temperature in the range from about 75° C. to about 125° C., more preferably at about 100° C. Temperatures higher than those in the preferred range and up to about 150° C. are suitable for the practice of the method of this invention, but can deleteriously effect the activity of the catalyst. The contact between the catalyst and oxygen-containing gas can suitably occur at temperatures as low as about 20° C., but the required contact time will be uneconomically extended.

It is preferred that the oxygen-containing gas contacting the catalyst flow at a rate from about 0.5 to about 10 milliliter equivalents of oxygen per minute per gram of catalyst. The flow rate is not necessarily critical, but it is desirable that the flow rate is fast enough that the oxidation time is not uneconomically long, particularly when temperatures above 125° C. are employed. It is also desirable that the rate of oxygen flow is slow enough, so that the gas is not wasted. Conveniently the oxygen-containing gas is at atmospheric or superatmospheric pressures during contact. The contact time required in accordance with the present method for an oxygen-containing gas flowing at a rate in the preferred range and at about 100° C. is typically from about 16 to about 24 hours. The contact time may be longer or shorter than this typical range depending on the temperature during contact, the degree of deactivation of the catalyst as well as other factors.

The catalyst after treatment with the oxygen-containing gas is contacted once again with a polar organic solvent. This contact can conveniently occur under the atmosphere of the oxygen-containing gas or any other convenient atmosphere. The contact can be achieved by any well-known contacting procedure which permits substantially all of the catalyst to come in contact with the organic solvent.

The temperature and pressure conditions during the contact of the oxygen-treated catalyst are not necessarily critical. The suitable and desirable temperature and pressure ranges are substantially the same as those employed in the treatment of the deactivated catalyst with the polar organic solvent as set out previously.

The suitable and various degrees of preferred polar organic solvents are identical to those set out previously as suitable for contacting the deactivated catalyst. Conveniently, the same solvent is used to contact the oxygen-treated catalyst as is used to contact the deactivated catalyst. At temperatures in the preferred range, the contact duration can conveniently be relatively short, generally in the range from about 0.5 to about 1 hour. Longer times can be employed, but are not desirable for reasons of economy. Shorter times can be used if the catalyst was only slightly deactivated.

In some instances, as where most of the impurities were removed prior to the treatment with the oxygen-containing gas or where the catalyst is employed in a process in which the catalytic reaction medium is frequently changed, the catalytic reaction medium can optionally be employed as the polar organic solvent which contacts the oxygen-treated catalyst. Generally, however, it is preferred to use a separate contacting solution so as to avoid contamination of the hydrogenation medium with these impurities.

Catalysts to which the method of this invention is particularly applicable, when regenerated by this process, typically have catalytic activities equal to 90 percent or more of the activity of "broken in" new catalysts even after 2 or 3 regenerations. The expression "broken in" describes new catalysts which have been used until all the fine particle fractions of the catalysts have been removed and the catalytic activity reaches a steady state. The catalytic activity of a hydrogenation catalyst can be related to the ability of the catalyst to take up hydrogen when it is being used to reduce organic nitro compounds to amines. The take up of hydrogen can be conveniently determined by monitoring by a suitable analytical method, such as a gas chromatograph, the formation of the hydrogenated product. A broken in, new catalyst of 1 percent palladium by weight supported on carbon will take up in excess of 7 milliliters (ml) of hydrogen per minute per gram of catalyst during the reduction of nitrophenol to aminophenol, whereas a deactivated catalyst of the same composition will take up less than about 3 ml of hydrogen per minute per gram of catalyst.

The following example is presented to illustrate, but not in any manner limit, the invention.

EXAMPLE 1

The activity of a 1 percent palladium on carbon catalyst used in the fixed-bed catalytic hydrogenation of p-nitrophenol to p-aminophenol in a hydrogenation reaction vessel has diminished from a hydrogen uptake of 7.2 ml hydrogen per minute per gram of catalyst when the catalyst was fresh to a present value of 2 ml per minute per gram of catalyst. The total mass of catalyst present is about 72.5 grams. The hydrogenation reaction vessel is drained of the acetic acid hydrogenation medium and 1 liter of glacial acetic acid, an amount sufficient to immerse substantially all of the catalyst, is introduced into the reactor at a temperature in the range from 70° C. to 100° C. under an atmosphere of air at atmospheric pressure. The contact between the acetic acid and catalyst is maintained for about 1 hour and then said acid is drained from the reactor.

The acetic acid-treated catalyst is contacted with 1 liter of distilled water, an amount sufficient to contact substantially all of the catalyst. The contact between the catalyst and water is maintained for a period of 0.5 hour at a temperature of about 70° C. The water is then drained from the reactor.

The reactor is purged with hydrogen to create a hydrogen atmosphere at a pressure of about 25 psig. One liter of an aqueous solution of sodium hydroxide at a concentration of 1 normal is introduced into the reactor. The contact between the catalyst and the sodium hydroxide solution is maintained for a period of 1 hour at a temperature of about 100° C. At the end of the contact time, the sodium hydroxide is drained from the reactor and the catalyst washed with distilled water until the wash water is substantially neutral after contacting the catalyst.

The washed catalyst is then treated with a stream of air at a temperature of about 100° C. and at a pressure of about 50 psig. The catalyst is treated with air for a period from 16 to 24 hours. During the treatment period the flow rate of the air is in the range from 5 to 10 milliliters (ml) per minute per gram of catalyst.

The oxygen-treated catalyst is then washed with glacial acetic acid at a temperature of about 70° C. under an atmosphere of air. The catalyst is washed with 1 liter of acetic acid over a period of about 0.5 hour. The reactor is then drained of all the acetic acid.

A hydrogenation medium containing p-nitrophenol in an acetic acid solution in a concentration of about 1 mole per liter is introduced into the hydrogenation reactor vessel. The regenerated catalyst has an average uptake of hydrogen of about 7.2 ml per minute per gram of catalyst.

Comparative Example 2

The activity of a 1 percent palladium on carbon catalyst used in the catalytic hydrogenation of p-nitrophenol to p-aminophenol has diminished from the original 7.2 to the present 2 ml of hydrogen per minute per gram of catalyst. In a manner identical to that in Example 1, the deactivated catalyst is first immersed in glacial acetic acid and then is contacted with distilled water. The catalyst is drained and then immersed in a 0.1 normal solution of sodium hydroxide for 1 hour at a temperature of 100° C. and under a pressure of about 25 psig. At the end of the contact time the catalyst is washed with distilled water until the wash water is substantially neutral after contact with the catalyst. This regeneration method does not embody the method of the invention, but illustrates some prior art practices.

A hydrogenation medium containing p-nitrophenol in an acetic acid solution in a concentration of 1 mole per liter is brought together with the catalyst after the foregoing treatment. The regenerated catalyst has an average uptake of hydrogen of about 2.5 ml per minute per gram of catalyst. The use of a 0.1 normal hydroxide solution in place of the 1 normal solution in Example 1 does not explain the much lower degree of regeneration effected herein. Hence, it is clear that treatment of a deactivated catalyst with a hydroxide solution is not sufficient to more than slightly regenerate it.

Comparative Example 3

This regeneration method does not embody the method of the invention, but illustrates prior art practices. In a manner identical to Example 2, a deactivated catalyst is first immersed in glacial acetic acid and then is contacted with distilled water. The catalyst is drained and then is treated with air at a temperature of about 100° C. and flowing through the catalyst at a rate between 5 and 10 milliliters per minute per gram of catalyst for a period of 16 hours. Finally, the catalyst is washed with acetic acid.

A hydrogenation medium containing 1 mole of p-nitrophenol per liter of acetic acid is brought together with the catalyst. The regenerated catalyst has an average uptake of hydrogen of about 3 ml per minute per gram of catalyst compared to its deactivated activity of 2 ml hydrogen per minute per gram of catalyst. Hence, it is clear that oxidative treatment of the deactivated catalyst does not suffice to more than slightly regenerate it.

What is claimed is:

1. A process for regenerating the activity of a noble metal catalyst which has become deactivated in the reduction of organic compounds with nitro moieties to the corresponding aminated derivative, comprising the sequential steps of: (a) contacting said deactivated catalyst with a liquid, polar organic solvent having from 1 to 10 carbon atoms; (b) contacting the catalyst with a liquid, aqueous solution of an alkali metal hydroxide at a temperature from about 20° C. to about 150° C.; (c) contacting the catalyst with an oxygen-containing gas at a temperature from about 20° C. to about 150° C. prior to or following Step (b); and (d) contacting said catalyst once again with a liquid, polar organic solvent having from 1 to 10 carbon atoms, so as to effect regeneration of the deactivated catalyst.

2. The process as defined in claim 1 wherein the catalyst to be regenerated has become deactivated in the reduction of compounds of the formula

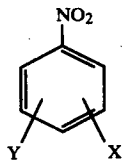

wherein X and Y are, independently, hydrogen, hydroxyl, nitro, alkyl of 1 to 3 carbon atoms, alkoxyl of 1 to 3 carbon atoms, hydroxyalkyl of 1 to 3 carbon atoms, amino, or hydroxyamino moieties and at least one of the X and Y substituents is located in an ortho or para position relative to the nitro groups.

3. The process as defined in claim 2 wherein the catalyst to be regenerated is palladium on a carbon support material and the weight concentration of the palladium is from about 0.1 percent to 25 percent.

4. The process as defined in claim 3 wherein the polar organic solvent in Steps (a) and (d) is independently selected from the group consisting of methanol, ethanol, n-propanol, n-butanol, isopropanol, isobutanol, sec-butanol, tert-butanol, allyl alcohol, crotyl alcohol, formic acid, acetic acid, propionic acid, butyric acid, ethylene glycol, propylene glycol, 1,3-propanediol, 1,2-butanediol, meso-2,3-butanediol, 1,4-butanediol, glycerol, ethyl ether and n-propyl ether.

5. The process as defined in claim 4 wherein the catalyst in Step (b) is contacted with the aqueous solution of an alkali metal hydroxide under an inert atmosphere at a pressure in the range from about 20 to about 50 psig and at a temperature from about 75° C. to about 125° C.

6. The process as defined in claim 5 wherein the catalyst after Step (c) is washed with water until the wash water remains substantially neutral during contact with the catalyst.

7. The process as defined in claim 6 wherein the catalyst after Step (b) and the water wash is contacted in Step (c) with an oxygen-containing gas at a temperature from about 75° C. to about 125° C.

8. The process as defined in claim 7 wherein the alkali metal hydroxide is sodium hydroxide.

9. The process as defined in claim 8 wherein the catalyst after Step (a) is washed with water prior to contact with the aqueous sodium hydroxide solution.

10. A process for regenerating the activity of a palladium catalyst supported on carbon with a concentration from about 0.5 percent to about 2 percent palladium by weight, where said catalyst has become deactivated to a level of activity less than 50 percent of that of a broken in, new catalyst in the reduction of compounds of the formula

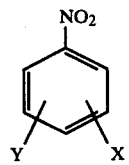

wherein X and Y are, independently, hydrogen, hydroxyl, nitro, alkyl of 1 to 3 carbon atoms, alkoxyl of 1 to 3 carbon atoms, hydroxyalkyl of 1 to 3 carbon atoms, amino, or hydroxyamino moieties and at least one of the X and Y substituents is located in an ortho or para position relative to the nitro group, said process comprising the sequential steps of: (a) contacting said deactivated catalyst with a liquid, polar organic solvent having from 1 to 10 carbon atoms; (b) contacting the catalyst under a substantially inert atmosphere slightly above atmospheric pressure with a liquid, aqueous solution of sodium hydroxide with a concentration of at least about 0.1 normal and at a temperature from about 50° C. to about 150° C.; (c) washing the hydroxide-treated catalyst with water until the wash water is substantially neutral; (d) contacting the water-washed catalyst with an oxygen-containing gas at a temperature from about 75° C. to about 150° C.; and (e) contacting said oxygen-treated catalyst once again with a liquid, polar organic solvent having from 1 to 10 carbon atoms, so as to effect regeneration of the deactivated catalyst to a level of activity at least 70 percent of the level of activity of a broken in, new catalyst.

* * * * *